US012416576B2

(12) United States Patent
Benedict et al.

(10) Patent No.: US 12,416,576 B2
(45) Date of Patent: Sep. 16, 2025

(54) METHOD OF RAMAN SPECTROSPY (71) Applicant: Endress+Hauser Optical Analysis, Inc., Ann Arbor, MI (US)

(72) Inventors: Randy Benedict, Ann Arbor, MI (US); Joel Patrow, Ann Arbor, MI (US)

(73) Assignee: Endress+Hauser Optical Analysis, Inc., Ann Arbor, MI (US)

( * ) Notice: Subject to any disclaimer, the term of this patent is extended or adjusted under 35 U.S.C. 154(b) by 139 days.

(21) Appl. No.: 18/500,379

(22) Filed: Nov. 2, 2023

(65) Prior Publication Data

US 2025/0146941 A1 May 8, 2025

(51) Int. Cl.
*G01J 3/44* (2006.01)
*G01J 3/28* (2006.01)
*G01N 21/65* (2006.01)

(52) U.S. Cl.
CPC ............. *G01N 21/65* (2013.01); *G01J 3/28* (2013.01); *G01J 3/44* (2013.01)

(58) Field of Classification Search
CPC ............. G01N 21/65; G01J 2003/2833; G01J 2003/2843; G01J 2003/2859;
(Continued)

(56) References Cited

U.S. PATENT DOCUMENTS 6,064,897 A * 5/2000 Lindberg ............ A61B 5/1455
600/316
9,874,522 B2 * 1/2018 Alon .................... G01J 3/4412
(Continued)

FOREIGN PATENT DOCUMENTS

JP 2020511661 A 4/2020

OTHER PUBLICATIONS

Korepanov, Vitaly I., Asymmetric least-squares baseline algorithm with peak screening for automatic processing of the Raman spectra, Journal of Raman Spectroscopy, 2020, pp. 1-5, https://doi.org/10.1002/jrs.5952.
(Continued)

*Primary Examiner* — Abdullahi Nur
(74) *Attorney, Agent, or Firm* — Gil M. Repa; Endress+Hauser (USA) Holding, Inc.

(57) ABSTRACT

A method includes, with a Raman spectrometer: determining a measured spectrum; determining a second derivative of a difference spectrum function corresponding to a difference between the measured spectrum and a product of a scaling coefficient and a reference spectrum of contributions of interfering influences included in the measured spectrum; determining a coefficient value of the scaling coefficient minimizing an error function including a term corresponding to an error of the difference spectrum function due to peaks included in the reference spectrum, the term including a sum of areas enclosed underneath the second derivative in all spectral regions in which the second derivative is positive, and/or a sum of areas enclosed underneath the second derivative in all spectral regions in which the second derivative is negative; and determining a Raman difference spectrum corresponding to the difference between the measured spectrum and a product of the coefficient value and the reference spectrum.

20 Claims, 4 Drawing Sheets (58) Field of Classification Search
CPC ........ G01J 2003/4424; G01J 3/02; G01J 3/28; G01J 3/44
See application file for complete search history.

(56) References Cited

U.S. PATENT DOCUMENTS

| | | |
|---|---|---|
| 2004/0186383 A1 | 9/2004 | Rava et al. |
| 2010/0042348 A1* | 2/2010 | Bakker ................ G01N 21/65 356/243.1 |
| 2023/0039380 A1 | 2/2023 | Perston |

OTHER PUBLICATIONS

Loethen, Yvette L. et al., Second-Derivative Variance Minimization Method for Automated Spectral Subtraction, Applied Spectroscopy, vol. 58, No. 3, 2004, pp. 272-278.

* cited by examiner

METHOD OF RAMAN SPECTROSPY

TECHNICAL FIELD

The present disclosure relates to a method of Raman spectroscopy, in particular, a method for eliminating the contributions of interfering influences included in measured spectra.

BACKGROUND

Raman spectroscopy is a technique used to measure the wavelength and intensity of inelastically scattered radiation (e.g., light) from a sample, thereby revealing a chemical and structural composition of the sample. Raman spectroscopy is based on the principle that monochromatic excitation light will be reflected, absorbed, or scattered as a function of the particular molecule (e.g., protein, peptide, carbohydrate, cytokine, salt, etc.) that receives the incident radiation. Most of the energy is scattered at the same wavelength of the excitation light, referred to as elastic or Rayleigh scattering. A much, much smaller amount (e.g., ~0.001%) is scattered at different wavelengths (i.e., shifted), called inelastic or Raman scattering, the wavelengths of which are dependent on the molecular composition of the region sampled. In Raman spectroscopic analysis (interchangeably, Raman analysis and Raman spectroscopy), these wavelength shifts are captured in Raman spectra comprising the Raman scattered light (i.e., the Raman signal), which are analyzed to determine sample properties, including both chemical and physical properties.

Raman spectrometers are currently employed in a large variety of different applications, including industrial applications and laboratory applications to determine and provide measurement results of various measurands of a medium. As an example, Raman spectrometers are, e.g., employed to determine concentrations of components included in the medium, a pH-value of the medium, a melt index of the medium and/or a cell motility of the medium.

Raman spectrometers commonly include a light source transmitting monochromatic excitation light to a sample of the medium and a spectrometric unit receiving Raman scattered light emanating from the sample and determining and providing measured spectra corresponding to intensity spectra of the Raman scattered light. The measured spectra are, e.g., provided to an evaluation unit determining and providing measurement results of the respective measurand based on a previously determined model for determining the measurement results based on spectral intensities of the measured spectra.

Models used in Raman spectroscopy to determine measurement results of measurands can, for example, be determined based on measured spectra of samples exhibiting known values of the respective measurand and a detailed mathematical analysis of the sample spectra.

One of the problems associated to Raman spectroscopic measurements is, however, that at least some of the information on the measurand(s) contained in measured spectra of a medium may be obscured by contributions of interfering influences included in the measured spectra. As an example, measurements of a concentration of a target analyte contained in a medium including multiple components may be impaired by contributions of an interfering analyte to the spectral intensity of the measured spectra in spectral regions of interest with respect to the determination of the concentration of the target analyte. With respect to media including a solute dissolved in a solvent, measurements of measurands of the solute may be impaired by contributions of the solvent to the spectral intensities of the measured spectra.

As another example, spectral information for determining a measurand may be obscured by contributions of light contaminations included in the light received by the spectrometric unit of the Raman spectrometer. Depending on the Raman spectroscopic instrumentation used and/or the application where it is employed, light contaminations, e.g., include fluorescent light emitted by fluorescent materials located along an optical path extending from the light source to the spectrometric unit that are illuminated by the excitation light.

In many applications, contributions of interfering influences included in the measured spectra make accurately determining the measurand(s) difficult or even impossible. Accordingly, there is a need to eliminate the contributions of interfering influences included in measured spectra.

One approach to achieve this goal is to determine Raman difference spectra by subtracting a reference spectrum of the contributions of the interfering influences from the measured spectra. As an example, a reference spectrum of contributions of an interfering analyte contained in a medium may be subtracted from measured spectra of the medium. To eliminate the contributions of interfering influences, the reference spectra have to be scaled according to a magnitude of the contributions of the interfering influences included in the measured spectra in a manner accounting for the intensity scale of the Raman spectrometer providing the measured spectra. Scaling is, e.g., performed by determining the spectral intensity values of the Raman difference spectra as differences between the spectral intensity values of the measured spectra and the product of a scaling coefficient and the spectral intensity value of the reference spectrum at the respective spectral line.

Determining the coefficient value of the scaling coefficient corresponding to the magnitude of the contributions of the interfering influences included in the measured spectra may, however, be a difficult task, in particular, in applications where the concentration of an interfering analyte is unknown or variable and/or where an intensity of light contaminations may vary. Under-subtracting by applying a coefficient value that is too small will result in Raman difference spectra in which spectral information for determining the measurand(s) may still be obscured by remaining contributions of the interfering influences. Over-subtracting by applying a coefficient value that is too large may alter or even remove spectral information that could otherwise be used to determine the measurand(s).

Whereas experimental and/or manual determinations of the coefficient value may be tedious and error-prone some progress has been made with respect to automating spectral subtractions.

The article "Second-Derivative Variance Minimization Method for Automated Spectral Subtraction" by Yvette L. Loethen, et al., published in 2004 in Applied Spectroscopy, Volume 58, Number 3, describes a second derivative minimization (SDVM) procedure for automatically extracting spectra of a dilute component included in a medium from measured spectra of the medium that are dominated by a major component, e.g., a solvent. According to this method, the scaling coefficient value for determining Raman difference spectra by subtracting a correspondingly scaled reference spectrum of the solvent from the measured spectra is determined such that it minimizes an error function given by the variance of a second order derivative of the smoothened Raman difference spectra.

As outlined in the article, this method provides the advantage of being less vulnerable to noise and fluorescence interferences than other methods. The use of this method is, however, limited to applications in which the variance of the second order derivatives of the smoothened Raman difference spectra exhibit a minimum at the optimum value of the scaling coefficient, which minimum is pronounced enough to enable a sufficiently accurate determination of the scaling coefficient value minimizing the variance.

This aspect makes the method unsuitable for applications in which the variance is a shallow function of the scaling coefficient. The latter is, e.g., the case in applications where the solute spectra and the solvent spectra are highly correlated and/or include overlapping spectral peaks. The shallower the error function is, the larger is the error associated to the determination of the scaling coefficient value minimizing the function. Depending on the degree of correlation and/or spectral overlap, the error function may be so shallow that the error associated to the determination of the minimum exceeds a maximum permissible tolerance.

The article "Asymmetric least-square baseline algorithm with peak screening for automatic processing of the Raman spectra" by Vitaly I. Korepanov, published in the Journal of Raman Spectroscopy, 2020; 1-5 (https://doi.org/10.1002/jrs.5952), discloses a method of determining a smooth baseline representing the contributions of interfering influences included in measured Raman spectra by minimizing an error function given by a sum of two terms. The first term is an asymmetric weighted sum of the squares of the differences between the spectral intensity values of the measured spectrum and the baseline, in which weighing factors applied to differences due to spectral intensity values of the measured spectrum exceeding the corresponding spectral intensity value of the baseline are substantially lower than weighing factors applied to differences due to spectral intensity values of the measured spectrum subsiding the corresponding spectral intensity value of the baseline. The second term is given by the product of a constant penalty factor and the sum of the squares of the second derivative of the baseline at the individual spectral lines.

As recognized in this article, in peak regions of the measured spectrum the differences between the spectral intensity values of the measured spectrum and the baseline may become large enough to cause undesired inflections of the estimated baseline. According to the article, this problem can be solved by performing an iterative process of determining the weighing factors in a manner accounting for the peak regions.

Asymmetric least square algorithms (ALS), like the algorithms described in the article cited above, can also be used to determine coefficient values of scaling coefficients for determining Raman difference spectra by subtracting a scaled reference spectrum of contributions of interfering influences from the measured spectra. In this context, they provide good results with respect to eliminating contributions of interfering influences, such as broad band luminescence light, exhibiting fairly smooth intensity profiles.

A disadvantage of corresponding ALS algorithms is, however, that they penalize the second derivative of the reference spectra. This fundamentally increases the penalty applied to any peak region the reference spectrum may exhibit. As a result, scaling coefficient values determined based on ALS algorithms for reference spectra exhibiting distinct peaks tend to be too small. This leads to undersubtraction resulting in Raman difference spectra, where valuable spectral information may still be obscured by contributions of interfering influences remaining in the Raman difference spectra.

Accordingly, there remains a need for further contributions in this area of technology. As an example, there is a need for a method that is more capable of eliminating contributions of interfering influences included in measured spectra in applications, where the contributions exhibit a peaky reference spectrum and/or a reference spectrum including spectral features that are correlated to and/or at least partially overlap with other spectral features included in the measured spectra.

SUMMARY

The present disclosure includes a method of Raman spectroscopy comprising determining and providing Raman difference spectra for performing Raman spectroscopic measurements of at least one measurand of a medium in at least one application, wherein measured spectra of the medium include contributions of interfering influences that at least partially obscure spectra features associated to the measurand(s), the method comprising in at least one application performing the method steps of:

with a Raman spectrometer, determining at least one measured spectrum of the medium;

providing a reference spectrum of the contributions of the interfering influences included in the measured spectrum;

determining a difference spectrum function corresponding to a difference between the measured spectrum and a product of a scaling coefficient and the reference spectrum;

determining a second derivative of the difference spectrum function with respect to a spectral line;

determining a coefficient value of the scaling coefficient corresponding to a magnitude of the contributions of the interfering influences included in the measured spectrum such that the coefficient value minimizes an error function representing an error of the difference spectrum function as a function of the scaling coefficient, wherein the error function includes a first term corresponding to an error exhibited by the difference spectrum function due to peaks included in the reference spectrum, the first term including at least one of:

a first sum of areas enclosed underneath the second derivative of the difference spectrum function in all spectral regions in which the second derivative of the difference spectrum function is positive; and a second sum of areas enclosed underneath the second derivative of the difference spectrum function in all spectral regions in which the second derivative of the difference spectrum function is negative; and for at least one measured spectrum determined by the Raman spectrometer, determining and providing a Raman difference spectrum corresponding to the difference between the respective measured spectrum and a product of the coefficient value and the reference spectrum.

The method provides the advantage that it enables for the coefficient value corresponding to the magnitude of the contributions of the interfering influences included in the measured spectrum to be accurately determined in applications in which the reference spectrum is a peaky spectrum including at least one peak. In context with peaky reference spectra, the first term included in the error function provides the advantage of being a V-shaped function of the scaling coefficient causing the error function to exhibit a distinct, and therefore accurately determinable, minimum at the coefficient value corresponding to the magnitude of the contributions of the interfering influences included in the measured spectrum. The accurate determination of the coefficient value provides the advantage that the Raman difference spectra provided by the method are of high quality due to the elimination of the contributions of the interfering influences achieved by employing the accurately determined coefficient value of the scaling coefficient.

In certain embodiments, the method comprises, using a smoothing filter, a second or higher order smoothing filter, a Savitzky-Golay filter, a second or higher order Savitzky-Golay filter, or a wavelet decomposition filter, filtering the measured spectrum and the reference spectrum, and determining the difference spectrum function and/or the second derivative of the difference spectrum function based on the filtered measured spectrum and the filtered reference spectrum.

In certain embodiments, the first term is determined as a sum or a weighted sum of the first sum and the second sum, as an integral or a trapezoidal integral of the absolute values of the spectral values of the second derivative of the difference spectrum function over the spectral range, as a term given by the sum of the first sum and the product of a penalty factor and the second sum, or as a term given by a sum of two products, wherein the first product is determined by multiplying the first sum with a penalty factor and the second product is determined by multiplying the difference between one and the penalty factor with the second sum. In addition or as an alternative, the first sum is determined as an integral or a trapezoidal integral of a rectified linear unit of the spectral values of the second derivative of the difference spectrum function over the spectral range, and/or the second sum is determined as an integral or a trapezoidal integral of a rectified linear unit of negative one times the spectral values of the second derivative over the spectral range.

According to an embodiment, the error function further includes a second term, and the second term, at least one of:
  corresponds to an error of the difference spectrum function due to negative spectral intensity values of the difference spectrum function caused by over-subtraction;
  is given by a sum of areas enclosed underneath the difference spectrum function in all spectral regions in which the spectral intensity values of the difference spectrum function are negative; and
  is determined as an integral or a trapezoidal integral of a rectified linear unit of minus one times the spectral intensity values of the difference spectrum function over the spectral range.

According to a refinement of such an embodiment, the error function further includes a third term, and the third term, at least one of:
  corresponds to an error of the difference spectrum function due to under-subtraction;
  is given by the sum of areas enclosed underneath the difference spectrum function in all spectral regions in which the spectral intensity values of the difference spectrum function are positive; and
  is determined as an integral or a trapezoidal integral of a rectified linear unit of the spectral intensity values of the difference spectrum function over the spectral range.

In certain embodiments of the refinement, the error function is given by:
  a sum or a weighted sum of the first term, the second term and the third term; or
  a sum of the first term, a product of a penalty factor and the second term and the third term.

In certain embodiments according to the embodiments of the refinement, in each application, the coefficient value is determined based on the error function including the first term, the second term and the third term, regardless of whether the reference spectrum is a peaky spectrum or a smooth spectrum.

Further embodiments of the method include, wherein:
  the error function either includes the first term and a function of the scaling coefficient or is given by a sum or a weighted sum of the first term and a function of the scaling coefficient;
  the function of the scaling coefficient is a function exhibiting a distinct minimum at the coefficient value corresponding to the magnitude of the interfering influences included in the measured spectrum in applications in which the reference spectrum is a smooth spectrum; and
  in each application, the coefficient value is determined based on the error function including the first term and the function regardless of whether the reference spectrum is a peaky spectrum or a smooth spectrum.

In certain embodiments, the method is either only performed in applications in which the reference spectrum is a peaky spectrum or the method includes in each application differentiating between whether the reference spectrum is a peaky spectrum or a smooth spectrum. In such embodiments, in at least one or each application, wherein the reference spectrum is a peaky spectrum, the error function:
  is given by the first term;
  is given by a sum or a weighted sum of the first term and a second term corresponding to an error of the difference spectrum function due to negative spectral intensity values of the difference spectrum function caused by over-subtraction; or
  is given by a sum of the first term and the product of a penalty factor pen and the second term corresponding to the error of the difference spectrum function due to negative spectral intensity values of the difference spectrum function caused by over-subtraction.

In certain embodiments, the method further comprises in each application differentiating between whether the reference spectrum is a peaky spectrum or a smooth spectrum, and based on the differentiation, determining the coefficient value such that the coefficient value minimizes the error function in case the reference spectrum is a peaky spectrum, and determining the coefficient value such that the coefficient value minimizes a replacement error function in case the reference spectrum is a smooth spectrum. In such embodiments, the replacement error function:
  is configured to exhibit a distinct minimum at the coefficient value corresponding to the magnitude of the interfering influences included in the measured spectrum in applications in which the reference spectrum is a smooth reference spectrum;
  is given by a variance of the second order derivative of the difference spectrum function; or
  is given by a sum of a first term corresponding to an asymmetric weighted sum of the squares of the differences between the spectral intensity values of the measured spectrum and the scaled reference spectrum and a product of a penalty factor and a second term corresponding to the sum of the squares of the second derivatives of the reference spectrum at individual spectral lines; wherein the weighing factors applied to the squares of differences due to spectral intensity values of the measured spectrum exceeding the corresponding spectral intensity values of the reference spectrum are smaller than weighing factors assigned to the squares of differences due to spectral intensity values of the measured spectrum subsiding the corresponding spectral intensity values of the reference spectrum.

According to at least one embodiment, the method further comprises, in at least one or each application:
a) determining whether the reference spectrum is a peaky spectrum; or
b) determining whether the reference spectrum a peaky spectrum by performing a visual inspection of the reference spectrum and determining the reference spectrum to be a peaky spectrum in case it includes at least one distinct peak; or
c) determining whether the reference spectrum is a peaky spectrum by determining a baseline of the reference spectrum, determining a residual spectrum corresponding to a difference between the reference spectrum and the baseline, based on the residual spectrum determining an indicator corresponding to a degree peakiness of the residual spectrum, and performing at least one of determining the reference spectrum to be a peaky spectrum when the indicator is larger than a predetermined threshold and determining the reference spectrum to be a smooth spectrum when the indicator is smaller than the predetermined threshold.

In certain embodiments of the method according to such an embodiment, the indicator is determined by determining a sum of the squares of the spectral intensity values of the residual spectrum or by determining a ratio of a sum of the squares of the spectral intensity values of the residual spectrum divided by a mean of the spectral intensity values of the residual spectrum, or the indicator is determined by determining a variance of the residual spectrum.

In certain embodiments, the method further comprises, based on at least one or each Raman difference spectrum, determining a measurement result of at least one measurand of the medium.

In further embodiments the method comprises for at least one measurand, based on Raman difference spectra determined by the method based on measured spectra of samples of media exhibiting known values of the measurand, determining a model for determining measurement results of the respective measurand.

The disclosure further includes embodiments, wherein:
in at least one or each application, the interfering influences include at least one of: light contaminations, luminescence light and/or fluorescence light exhibiting at least one intensity peak; influences of an interfering analyte, a composition of interfering analytes and/or a solvent included in the medium; and background influences, and/or broad band luminescence or fluorescence light exhibiting a smooth intensity profile; and/or
providing the reference spectrum includes:
with a Raman spectrometric instrument, determining and providing at least one intensity spectrum of the interfering influences and determining and providing the reference spectrum based on these intensity spectra; and/or determining the reference spectrum based on intensity spectra of at least one interfering analyte, a composition of interfering analytes, and/or a solvent included in the medium.

In certain embodiments, the method further comprises, with the Raman spectrometer, repeatedly determining and providing measured spectra and, for at least one or each measured spectrum, determining and providing the corresponding Raman difference spectrum; wherein:
for each measured spectrum, determining the Raman difference spectrum includes, based on the respective measured spectrum and the reference spectrum, determining the coefficient value corresponding to the magnitude of the contributions of the interfering influences included in the respective measured spectrum and determining the Raman difference spectrum based on this coefficient value;
the coefficient value determined based on a previously determined measured spectrum is employed to determine Raman difference spectra of a series of subsequently determined measured spectra; or
the coefficient value employed to determine the Raman difference spectra of successively determined measured spectra is at least once, repeatedly or periodically updated by repeating the previously performed determination of the coefficient value based on a newly determined measured spectrum.

The present disclosure further includes a Raman spectroscopic measurement system configured to perform the methods disclosed herein. The Raman spectroscopic measurement system comprises: a Raman spectrometer configured to determine and provide measured spectra of a medium; and a difference spectra determination unit configured to determine and provide Raman difference spectra based on the measured spectra and a reference spectrum of contributions of interfering influences included in the measured spectra provided to the difference spectra determination unit.

The present disclosure further includes a non-transitory computer readable medium storing instructions that, when executed by one or more programmable processors, cause the one or more programmable processors to perform operations defining a method of Raman spectroscopy comprising determining and providing Raman difference spectra for performing Raman spectroscopic measurements of at least one measurand of a medium in at least one application, wherein measured spectra of the medium include contributions of interfering influences that at least partially obscure spectra features associated to the measurand(s), based on at least one measured spectrum of the medium determined by a Raman spectrometer and a reference spectrum of the contributions of the interfering influences included in the measured spectrum provided to the one or more programmable processors. The instructions comprise:
computer code for determining a second derivative with respect to the spectral line of a difference spectrum function corresponding to a difference between the measured spectrum and the product of a scaling coefficient and the reference spectrum;
computer code for determining a coefficient value of the scaling coefficient corresponding to a magnitude of the contributions of the interfering influences included in the measured spectrum such that the coefficient value minimizes an error function representing an error of the difference spectrum function as a function of the scaling coefficient, wherein the error function includes a first term corresponding to an error exhibited by the difference spectrum function due to peaks included in the reference spectrum, the first term including at least one of:

a first sum of areas enclosed underneath the second derivative of the difference spectrum function in all spectral regions in which the second derivative of the difference spectrum function is positive;

a second sum of areas enclosed underneath the second derivative of the difference spectrum function in all spectral regions in which the second derivative of the difference spectrum function is negative; and computer code for, for at least one measured spectrum determined by the Raman spectrometer, determining and providing a Raman difference spectrum corresponding to the difference between the respective measured spectrum and the product of the coefficient value and the reference spectrum.

In a further aspect, the present disclosure further includes a Raman spectroscopic measurement system, comprising: a Raman spectrometer, comprising: a monochromatic light source configured to transmit excitation light having a predetermined excitation wavelength a measurement region configured to accommodate a sample of a medium as to illuminate the sample; and a spectrometric unit configured to receive Raman scattered light emanating from the illuminated sample and to provide measured spectra, including intensity spectra of the Raman scattered light, wherein the spectrometric unit includes a disperser, a detector, and a signal processor configured to determine and to provide spectral intensity values of the measured spectra based on signals from the detector; and a difference spectra determination unit configured to determine Raman difference spectra based on the measured spectra, wherein the signal processor of the spectrometric unit and the difference spectra determination unit are cooperatively configured to perform the method of the present disclosure.

In at least one embodiment, such a Raman spectroscopic measurement system further comprises a signal processing unit configured to determine and provide a measurement result of the at least one measurand of the medium based on the Raman difference spectra provided by the difference spectra determination unit and on a previously determined model for determining the measurement result based on spectral intensity values of the Raman difference spectra.

BRIEF DESCRIPTION OF THE DRAWINGS

The described embodiments and other features, advantages and disclosures contained herein, and the manner of attaining them, will become apparent and the present disclosure will be better understood by reference to the following description of various embodiments of the present disclosure taken in junction with the accompanying drawings, wherein.

DETAILED DESCRIPTION

Figure 1:
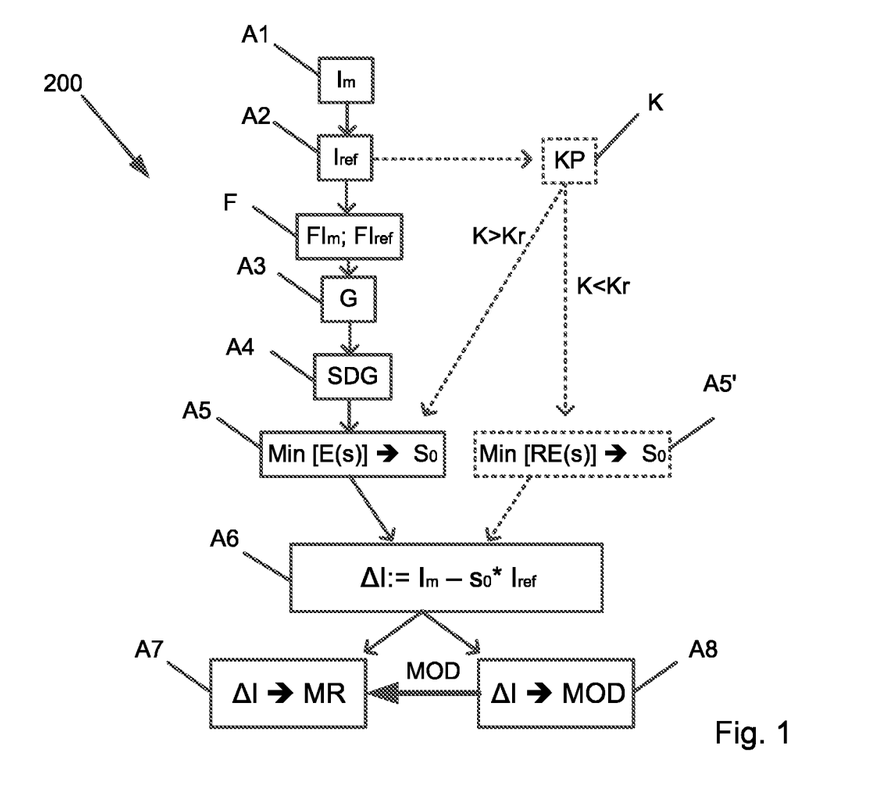
FIG. 1 shows a flow chart of a method of Raman spectroscopy according to the present disclosure.

The present disclosure includes a method of Raman spectroscopy comprising determining and providing Raman difference spectra $\Delta I$ for performing Raman spectroscopic measurements of at least one measurand of a medium in at least one application, wherein measured spectra $I_m$ of the medium include contributions of interfering influences, e.g., contributions that at least partially obscure spectra features associated to the measurand(s). A flow chart of the method 200 according to the present disclosure employed in each application is shown in FIG. 1.

Figure 2:
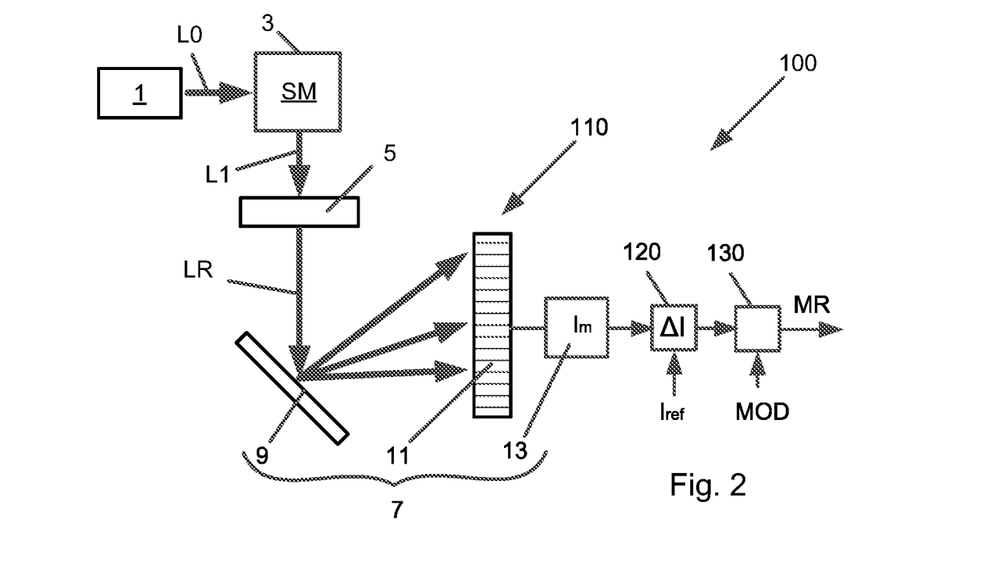
FIG. 2 shows a Raman spectrometric measurement system according to the present disclosure.

A Raman spectroscopic measurement system 100 for performing the method 200 is shown in FIG. 2. The Raman spectroscopic measurement system 100 includes a Raman spectrometer 110 configured for determining and providing measured spectra $I_m$ of the medium and a difference spectra determination unit 120 configured for determining and providing corresponding Raman difference spectra $\Delta I$ based on the measured spectra $I_m$, cooperatively configured for performing the method 200 shown in FIG. 1.

The exemplary Raman spectrometer 110 shown in FIG. 2 includes a monochromatic light source 1, e.g., a laser, configured to transmit excitation light L0 having a predetermined excitation wavelength $\lambda_0$ to a measurement region 3 configured to accommodate a sample SM of the medium.

In certain embodiments, the excitation wavelength $\lambda_0$ is, e.g., a wavelength in the visual or near infrared wavelengths range, e.g., a wavelength of 785 nm or of 532 nm. In certain embodiments, the Raman spectrometer 110, e.g., includes a filter 5, e.g., a notch-filter, configured to filter out Raman scattered light LR included in light L1 emanating from the measurement region 3.

The Raman spectrometer 110 further includes a spectrometric unit 7 configured to receive Raman scattered light LR emanating from the illuminated sample SM. The spectrometric unit 7 is configured to determine and to provide the measured spectra $I_m$. The measured spectra $I_m$ are, e.g., provided as intensity spectra of the Raman scattered light LR in a predetermined spectral range $\Delta\lambda$, e.g., a wavelength range or a wavenumber range of wavenumber shifts of Raman scattered light induced by excitation light L0 having the excitation wavelength $\lambda_0$.

In certain embodiments, the spectrometric unit 7, e.g., includes a disperser 9, e.g., a diffractive or holographic grating, dispersing the incident measurement light LR, a detector 11 receiving the dispersed Raman scattered light LR, and a signal processor 13, e.g., a microprocessor, connected to the detector 11. The detector 11 is configured to determine and to provide detector signals corresponding to spectral intensities of the incident dispersed measurement light LR. The signal processor 13 is configured to determine and to provide spectral intensity values $I_{m,i}$ of the measured spectra $I_m$ based on the detector signals.

The difference spectra determination unit 120 is, e.g., a computer, a microprocessor or another type of programmable calculating device including a memory, e.g., a non-transitory computer readable medium, and configured to determine the Raman difference spectra $\Delta I$ based on the measured spectra $I_m$ by executing a computer program, e.g., instructions executable by a processor, installed on the difference spectra determination unit 120.

In each application, the method 200 includes a method step A1 of, with the Raman spectrometer 110, determining a measured spectrum $I_m$ of the medium, and a method step A2 of providing a reference spectrum $I_{ref}$ of the contributions of the interfering influences included in the measured spectrum $I_m$.

Depending on the application, the interfering influences contributing to the measured spectra $I_m$, e.g., include light contaminations, e.g., luminescence or fluorescence light, exhibiting at least one intensity peak, and/or influences of an interfering analyte, of a composition of interfering analytes and/or of a solvent included in the medium. In addition or as an alternative, the interfering influences, e.g., include background influences, e.g., broad band luminescence or fluorescence light, exhibiting an at least approximately smooth intensity profile.

As used in the present disclosure, the term "peak" refers to a localized maximum of spectrum or function, which may have multiple localized maxima, and the term "valley" refers to a localized minimum of spectrum or function, which may have multiple localized minima. Accordingly, "peakiness" refers to the relative prevalence of localized maxima in a spectrum or function.

In certain embodiments, providing the reference spectrum $I_{ref}$, e.g., includes with a Raman spectrometric instrument determining and providing at least one intensity spectrum of the interfering influences and determining and providing the reference spectrum $I_{ref}$ based on these intensity spectra.

As an example, in certain embodiments, determining the reference spectrum $I_{ref}$, e.g., includes determining at least one intensity spectrum of the interfering analyte(s) and/or the solvent included in the medium. The determination of each intensity spectrum is, e.g., performed by a highly accurate spectroscopic measurement instrument and/or under laboratory conditions.

The reference spectrum $I_{ref}$ is, e.g., determined and/or provided as a normalized spectrum representing the spectral intensity distribution of the reference spectrum $I_{ref}$ on a normalized intensity scale, e.g., by determining spectral intensity values of the reference spectrum $I_{ref}$ as relative intensity values with respect to the maximum intensity value included in the reference spectrum $I_{ref}$.

Figure 3:
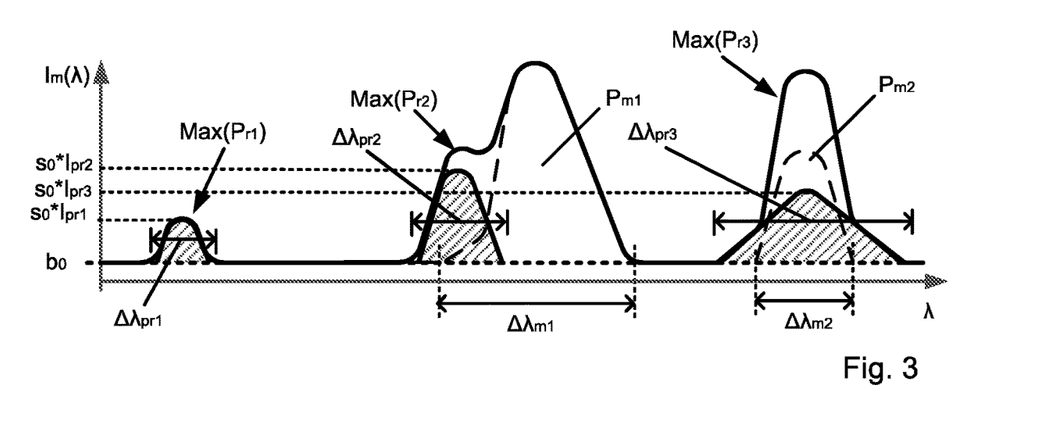
FIG. 3 shows an exemplary intensity profile of a measured spectrum.
Figure 4:
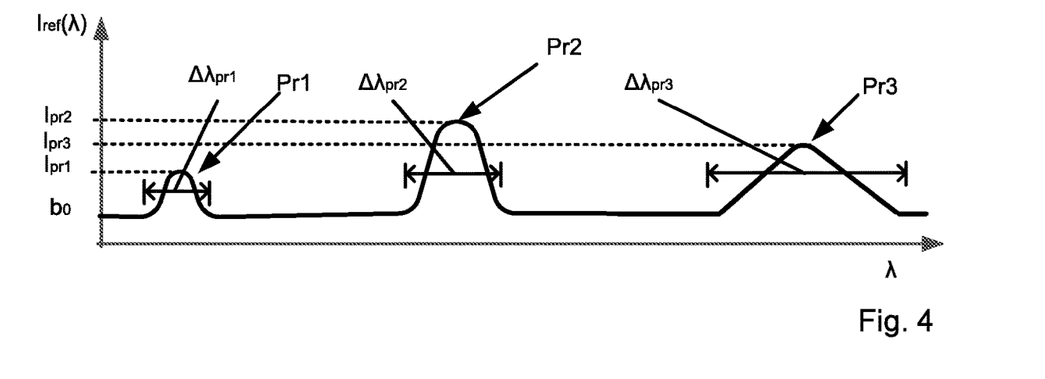
FIG. 4 shows an exemplary intensity profile of a reference spectrum exhibiting a constant baseline.

An exemplary intensity profile $I_m(\lambda)$ of the measured spectrum $I_m$ determined in method step A1 is shown in FIG. 3. FIG. 4 shows an exemplary intensity profile $I_{ref}(\lambda)$ of the reference spectrum $I_{ref}$ of the contributions of the interfering influences included in the measured spectrum $I_m$ shown in FIG. 3.

Figure 5:
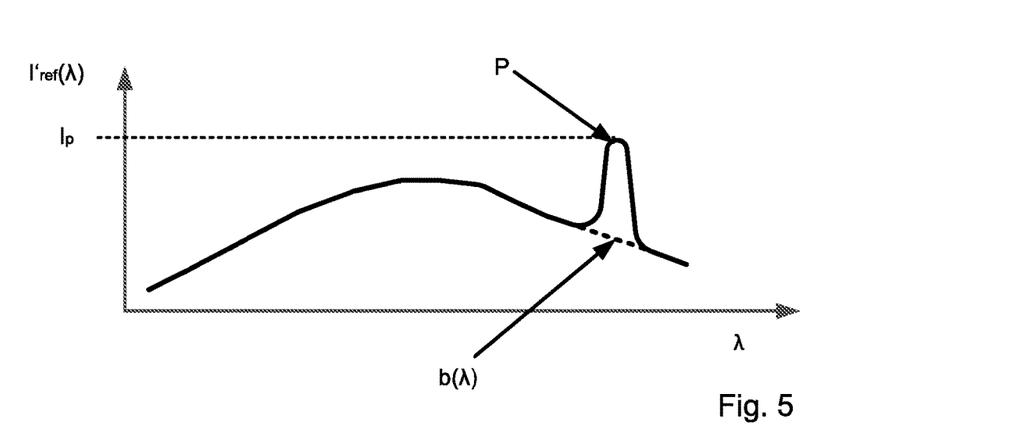
FIG. 5 shows an exemplary intensity profile of a reference spectrum exhibiting a smooth baseline.

In the example shown, the reference spectrum $I_{ref}$ is a peaky spectrum exhibiting multiple distinct peaks Pr1, Pr2, Pr3 superimposed on a constant baseline $b(\lambda):=b_0$. Even though the method 200 disclosed herein is subsequently described based on the exemplary intensity profiles $I_m(\lambda)$, $I_{ref}(\lambda)$ shown in FIGS. 3 and 4, the method 200 can be performed in the same way in applications in which the reference spectrum $I'_{ref}$ exhibits a smooth baseline $b(\lambda)$, e.g., a baseline $b(\lambda)$ caused by background influences, e.g., broad band luminescent or fluorescent light, exhibiting a smooth intensity profile, e.g., a profile including gradually curved sections. An example of an intensity profile $I'_{ref}(\lambda)$ of a reference spectrum $I'_{ref}$ exhibiting a distinct peak P superimposed on a smooth baseline $b(\lambda)$ is shown in FIG. 5.

As outlined in the introduction of the present disclosure, the negative impact of contributions of interfering influences on Raman spectroscopic measurements can be significantly reduced or even eliminated by determining and providing Raman difference spectra $\Delta I$ by subtracting correctly scaled reference spectra $s_0 * I_{ref}$ from the measured spectra $I_m$; e.g., by $\Delta I := I_m - s_0 * I_{ref}$, wherein $s_0$ is a coefficient value of a scaling coefficient s.

Eliminating the contributions of the interfering influences included in the respective measured spectrum $I_m$ by spectral subtraction requires for the coefficient value $s_0$ of the scaling coefficient s to be determined such that it corresponds to the magnitude of the contributions of the interfering influences included in the respective measured spectrum $I_m$. Undersubtracting by employing a first coefficient value $s_1$ of the scaling coefficient s that is too small, as well as oversubtracting by employing a second coefficient value $s_2$ of the scaling coefficient s that is too large, will modify the contributions of interfering influences included in the resulting Raman difference spectrum $\Delta I$, but neither will not remove them.

The methods of the present disclosure recognize that the effects of contributions of interfering influences on the measured spectra $I_m$ depend on the spectral shape of the reference spectrum $I_{ref}$ and that the effects of peaks Pr1, Pr2, Pr3 that may be included in the reference spectrum $I_{ref}$ have to be properly accounted for in the determination of coefficient value $s_0$.

In this respect, the method 200 includes a method step A3 of determining a difference spectrum function G corresponding to a difference between the measured spectrum $I_m$ and a product of the scaling coefficient s and the reference spectrum $I_{ref}$.

In certain embodiments, the method 200 further includes a method step F of filtering the measured spectrum $I_m$ and the reference spectrum $I_{ref}$. In such embodiments, the difference spectrum function G is determined based on the filtered measured spectrum $FI_m$ and the filtered reference spectrum $FI_{ref}$, e.g., by subtracting the product of the scaling coefficient s and the filtered reference spectrum $FI_{ref}$ from the filtered measured spectrum $FI_m$, e.g., by $G := FI_m - s * FI_{ref}$.

In method step F the filtering is, e.g., performed by with a smoothing filter filtering the measured spectrum $I_m$ and the reference spectrum $I_{ref}$. In certain embodiments, the smoothing filter is, e.g., a second or higher order smoothing filter, or a Savitzky-Golay filter, e.g., a second or higher order Savitzky-Golay filter, e.g., a Savitzky-Golay filter having a window width of 20 to 30, e.g., a window width of 25, and a polynomial order of 3 or higher. As an alternative another type of smoothing filter, e.g., a wavelet decomposition filter, may be used instead.

The filtering provides the advantage of eliminating noise included in the measured spectrum $I_m$ and the reference spectrum $I_{ref}$ which may otherwise impair the determination of the coefficient value $s_0$, e.g., due to noise induced errors of the difference spectrum function G.

At the same time, the filtering provides the advantage of maintaining the spectral shape of the respective spectrum. Thus, the spectral intensity profile of the filtered measured spectrum $FI_m$ is at least approximately identical to the spectral intensity profile $I_m(\lambda)$ of the unfiltered measured spectrum $I_m$, and the spectral intensity profile of the filtered reference spectrum $FI_{ref}$ is at least approximately identical to the spectral intensity profile $I_{ref}(\lambda)$ of the unfiltered reference spectrum $I_{ref}$.

In the method 200 disclosed herein, the determination of the coefficient value $s_0$ of the scaling coefficient s corresponding to the magnitude of the contributions of the interfering influences included in the respective measured spectrum $I_m$ includes a method step A4 of determining a second derivative SDG of the difference spectrum function G with respect to a spectral line $\lambda_i$ and includes a method step A5 of determining the coefficient value $s_0$ of the scaling coefficient corresponding to a magnitude of the contributions of the interfering influences included in the measured spectrum $I_m$ such that the coefficient value $s_0$ minimizes an error function E(s) representing an error of the difference spectrum function G as a function of the scaling coefficient s.

In method step A4, the second derivative SDG of the difference spectrum function G is, e.g., determined by subtracting the product of the scaling coefficient s and the second derivative $d^2/d\lambda^2(FI_{ref})$ of the filtered reference spectrum $FI_{ref}$ from the second derivative $d^2/d\lambda^2(FI_m)$ of the filtered measured spectrum $FI_m$, e.g., by $SDG := d^2/d\lambda^2 (FI_m) - s*d^2/d\lambda^2(FI_{ref})$.

In embodiments, wherein a Savitsky-Golay filter is employed to filter the measured spectrum $I_m$ and the reference spectrum $I_{ref}$, the filtering performed in method step F and the determination of the second derivative SDG performed in method step A4 is, e.g., performed in a combined single method step of performing a second order Savitsky-Golay differentiation of the difference spectrum function G here determined by subtracting product of the scaling coefficient s and the unfiltered reference spectrum $I_{ref}$ from the unfiltered measured spectrum $I_m$, e.g., by $\Delta := I_m - s*I_{ref}$.

In method step A5, the effects of peaks Pr1, Pr2, Pr3 included in the reference spectrum $I_{ref}$ are accounted for by the error function E(s) including a first term T1 corresponding to an error of the difference spectrum function G due to peaks Pr1, Pr2, Pr3 included in the reference spectrum $I_{ref}$.

The nature of this error and its dependency on the value of the scaling coefficient s is subsequently described based FIGS. 6-11, which illustrate the principle shape of exemplary difference spectrum functions $G(s_1)$, $G(s_0)$, $G(s_2)$ and the second derivatives $G(s_1)$, $G(s_0)$, $G(s_2)$ thereof, which have been determined based on the measured spectrum $I_m$ shown in FIG. 3 and the reference spectrum $I_{ref}$ shown in FIG. 4.

In the intensity profile $I_m(\lambda)$ of the measured spectrum $I_m$ shown in FIG. 3, the magnitude and the spectral shape of the contributions of the interfering influences included in the measured spectrum $I_m$ are indicated as shaded areas. Each shaded area corresponds to one of the peaks Pr1, Pr2, Pr3 of the reference spectrum $I_{ref}$. The exemplary peaks Pr1, Pr2, Pr3 of the reference spectrum $I_{ref}$ shown in FIG. 4 occur in different positions with respect to other spectral features Pm1, Pm2, e.g., peaks, included in the measured spectrum $I_m$.

As shown in FIG. 3, the first peak Pr1 of the reference spectrum $I_{ref}$ occurs in a first spectral region $\Delta\lambda$pr1, wherein the measured spectrum $I_m$ does not include any other spectral features. This first peak Pr1 causes the measured spectrum $I_m$ to include an additional first maximum Max(Pr1) in the first spectral region $\Delta\lambda$pr1. The second peak Pr2 of the reference spectrum $I_{ref}$ occurs in a second spectral region $\Delta\lambda$pr2, which partially overlaps with a spectral region $\Delta\lambda_{m1}$, wherein the measured spectrum $I_m$ includes the first spectral feature Pm1. Correspondingly the second peak Pr2 causes the measured spectrum $I_m$ to include an additional second maximum Max(Pr2) superimposed on one side of the first spectral feature Pm1. The third peak Pr3 of the reference spectrum $I_{ref}$ occurs in a third spectral region $\Delta\lambda$pr3 covering a spectral region $\Delta\lambda$m2, wherein the measured spectrum $I_m$ includes the second spectral feature Pm2. In the example shown, the third peak Pr3 causes the measured spectrum $I_m$ to include a third maximum Max(Pr3) exhibiting a maximum intensity exceeding the peak intensity of the second spectral feature Pm2 and a peak width exceeding the peak width of the second spectral feature Pm2 in the third spectral region $\Delta\lambda$pr3.

Figure 6:
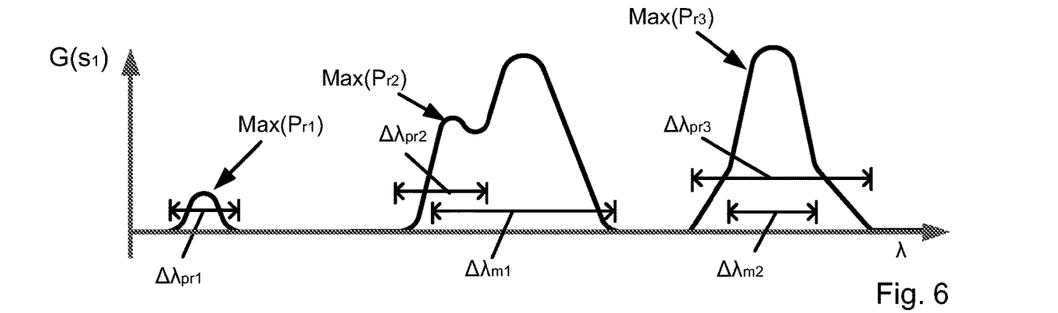
FIG. 6 shows a difference spectrum function determined by under-subtraction.
Figure 7:
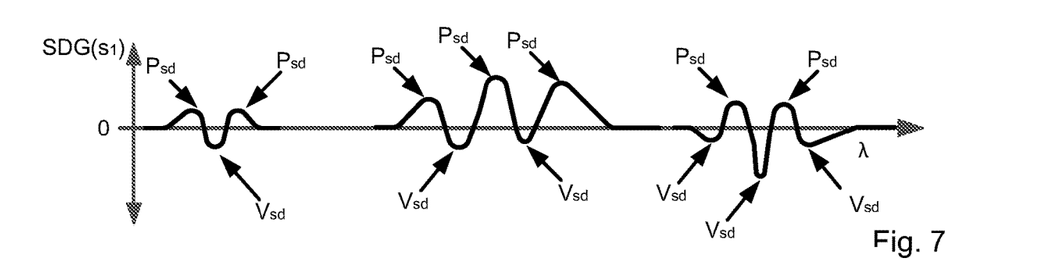
FIG. 7 shows a second derivative of the difference spectrum function shown in FIG. 6.

FIG. 6 shows the difference spectrum function $G(s_1)$ at a first coefficient value $s_1$ that is smaller than the coefficient value $s_0$ corresponding to the magnitude of the interfering influences included in the measured spectrum $I_m$. FIG. 7 shows the second derivative $SDG(s_1)$ of the difference spectrum function $G(s_1)$ at this first coefficient value $s_1$. The first coefficient value $s_1$ being too small results in under-subtraction.

Figure 8:
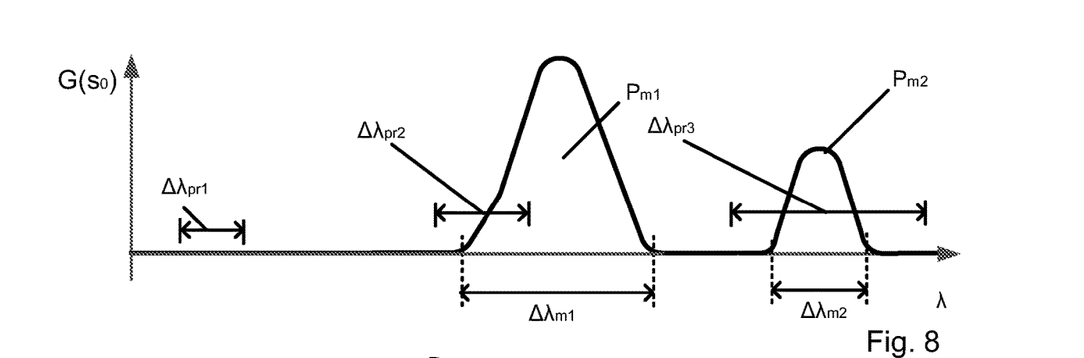
FIG. 8 shows a difference spectrum function determined by applying a coefficient value of a scaling coefficient corresponding to a magnitude of interfering influences included in the measured spectrum shown in FIG. 3.
Figure 9:
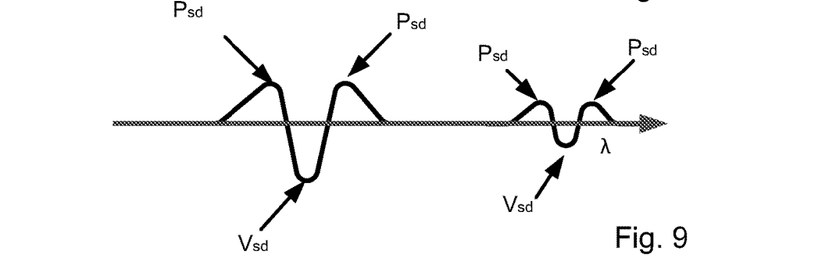
FIG. 9 shows a second derivative of the difference spectrum function shown in FIG. 8.

FIG. 8 shows the difference spectrum function $G(s_0)$ at the coefficient value $s_0$ corresponding to the magnitude of the interfering influences included in the measured spectrum $I_m$. FIG. 9 shows the second derivative $SDG(s_0)$ of the difference spectrum function $G(s_0)$ at this coefficient value $s_0$.

Figure 10:
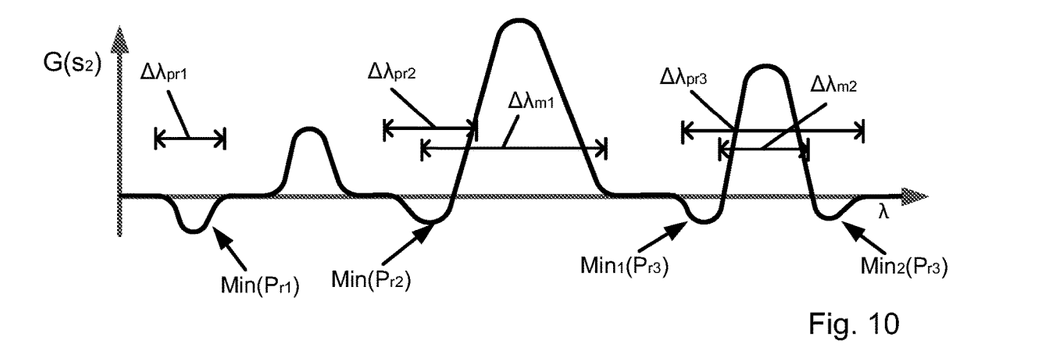
FIG. 10 shows a difference spectrum function determined by over-subtraction.
Figure 11:
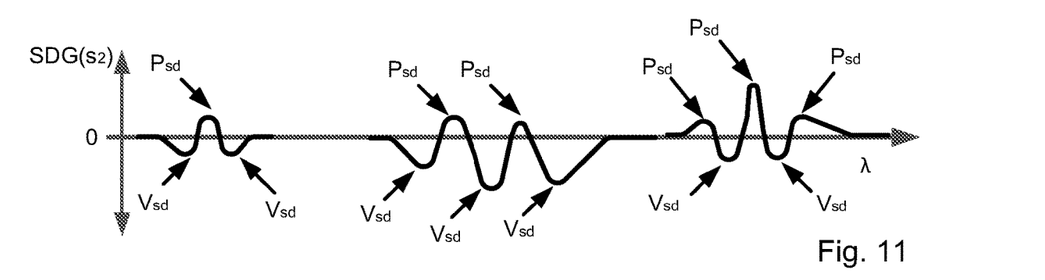
FIG. 11 shows a second derivative of the difference spectrum function shown in FIG. 10.

FIG. 10 shows the difference spectrum function $G(s_2)$ at a second coefficient value $s_2$ that is larger than the coefficient value $s_0$ corresponding to the magnitude of the interfering influences included in the measured spectrum $I_m$. FIG. 11 shows the second derivative $SDG(s_2)$ of the difference spectrum function $G(s_2)$ at this second coefficient value $s_2$. The second coefficient value $s_2$ being too large results in over-subtraction.

As shown in FIGS. 6 and 7, under-subtraction of the first peak Pr1 of the reference spectrum $I_{ref}$ reduces the pronouncedness of the first maximum Max(Pr1) but fails to eliminate the first maximum Max(Pr1). This causes the second derivative $SDG(s_1)$ shown in FIG. 7 two exhibit a valley Vsd surrounded by two peaks Psd corresponding to the points of inflection the difference spectrum function $G(s_1)$ shown in FIG. 6 in the first spectral region $\Delta\lambda$pr1.

As shown in FIGS. 8 and 9, applying the scaling coefficient value s corresponding to the magnitude of the interfering influences included in the measured spectrum $I_m$ eliminates the contributions of the first peak Pr1 of the reference spectrum $I_{ref}$ in the difference spectrum function $G(s_0)$. Correspondingly the second derivative $SDG(s_0)$ does not exhibit any peaks and the valleys in the first spectral region $\Delta\lambda$pr1.

Over-subtracting the first peak Pr1 of the reference spectrum $I_{ref}$ causes the difference spectrum function $G(s_2)$ shown in FIG. 10 to exhibit a minimum Min(Pr1). This causes the second derivative $SDG(s_2)$ shown in FIG. 11 two exhibit a peak Psd surrounded by two valleys Vsd in the first spectral region $\Delta\lambda$pr1 corresponding to the points of inflection of the difference spectrum function $G(s_2)$ shown in FIG. 10.

In an analogous manner, under-subtracting the partially overlapping second peak Pr2 of the reference spectrum $I_{ref}$ reduces the pronouncedness of the second maximum Max(Pr2) shown in FIG. 6, and over-subtracting the second peak Pr2 causes the difference spectrum function $G(s_2)$ shown in FIG. 10 to exhibit a minimum Min(Pr2). As is apparent from a comparison of second derivatives $SDG(s_1)$, $SDG(s_0)$, $SDG(s_2)$, shown in FIGS. 7, 9 and 11, respectively, under-subtraction and over-subtraction of the second peak Pr2 of the reference spectrum $I_{ref}$ causes the second derivative Gsd(s₁), Gsd(s₂) to exhibit additional peaks Psd and valleys Vsd that are eliminated, as shown in FIG. 9, when the coefficient value $s_0$ corresponding to the magnitude of the interfering influences included in the measured spectrum $I_m$ is applied.

With respect to the entirely overlapping third peak Pr3 of the reference spectrum $I_{ref}$ under-subtracting the third peak Pr3 as shown in FIG. 6 and over-subtracting the third peak Pr3 as shown in FIG. 10 both affect the peaky spectral shape of the respective difference spectrum function $G(s_1)$, $G(s_2)$ in the third spectral range $\Delta\lambda$pr3 in a manner causing the corresponding second derivatives $SDG(s_1)$, $SDG(s_2)$ shown in FIGS. 7 and 11 to exhibit additional peaks Psd and valleys Vsd, that are eliminated as shown in FIG. 9, when the coefficient value $s_0$ corresponding to the magnitude of the interfering influences included in the measured spectrum $I_m$ is applied.

As is apparent from this example, over-subtracting and under-subtracting peaky reference spectra $I_{ref}$ causes the second derivative SDG to exhibit additional peaks Psd and valleys Vsd. These additional peaks Psd and valleys Vsd occur regardless of the position of peaks Pr1, Pr2, Pr3 included in the reference spectrum $I_{ref}$ with respect to other spectral features Pm1, Pm2 included in the measured spectrum $I_m$.

Taking the first coefficient value $s_1$ as a starting point, gradually increasing the value of the scaling coefficient s up to the correct coefficient value $s_0$ reduces the pronouncedness of the additional peaks Psd included in the second derivative SDG due to the incorrect size of the scaling coefficient s such that they are eliminated when the scaling coefficient s reaches the correct coefficient value $s_0$. Further increasing the scaling coefficient s to values exceeding the correct coefficient value $s_0$ causes the additional peaks Psd included in the second derivative SDG due to under-subtraction to turn into valleys Vsd exhibited by second derivative SDG due to over-subtraction. Analogously, taking the first coefficient value $s_1$ as a starting point, gradually increasing the value of the scaling coefficient s up to the correct coefficient value $s_0$ reduces the pronouncedness of the additional valleys Vsd included in the second derivative SDG due to the incorrect size of the scaling coefficient s such that they are eliminated when the scaling coefficient s reaches the correct coefficient value $s_0$. Further increasing the scaling coefficient s to values exceeding the correct coefficient value $s_0$ causes the additional valleys Vsd included in the second derivative SDG due to under-subtraction to turn into peaks Psd exhibited by the second derivative SDG due to over-subtraction.

This effect enables for the error of the difference spectrum function G due to peaks Pr1, Pr2, Pr3 included in the reference spectrum $I_{ref}$ to be quantitatively determined as a function of the scaling coefficient s based on the size of the areas enclosed underneath the second derivative SDG, in the spectral regions where the second derivative SDG exhibits peaks Psd and/or based on the size of the areas enclosed underneath the second derivative SDG, in the spectral regions where the second derivative SDG exhibits valleys Vsd.

Correspondingly, the first term T1 of the error function E(s) includes a first sum S1 given by the sum of areas enclosed underneath the second derivative SDG of the difference spectrum function G in all spectral regions in which the second derivative SDG exhibits peaks Psd. These spectral regions are given by the spectral regions in which the second derivative SDG of the difference spectrum function G is positive.

In addition or as an alternative, the first term T1 of the error function E(s) includes a second sum S2 given by the sum of areas enclosed underneath the second derivative SDG of the difference spectrum function G in all spectral regions in which the second derivative SDG exhibits valleys Vsd. These spectral regions are given by the spectral regions in which the second derivative SDG of the difference spectrum function G is negative.

In certain embodiments, the first sum S1 is, e.g., determined as an integral, e.g., a trapezoidal integral trapz, of the rectified linear unit relU of the spectral values $SDG_i$ of the second derivative SDG over the spectral range $\Delta\lambda$, e.g., by S1:=trapz (relU($SDG_i$)), wherein the rectified linear unit relU (e.g., ramp function) of the spectral values $SDG_i$ is equal to the absolute value of the spectral values $SDG_i$ for all spectral values SDG; having a positive value larger or equal to zero and is equal to zero for all spectral values $SDG_i$ having a negative value.

Analogously the second sum S2 is, e.g., determined as an integral, e.g., a trapezoidal integral trapz of the rectified linear unit relU of minus one (−1) times the spectral values $SDG_i$ of the second derivative SDG over the spectral range $\Delta\lambda$, e.g., by S2:=trapz (relU(−$SDG_i$)).

In certain embodiments, the first term T1 is, e.g., determined as term T1a given by a sum of the first sum S1 and the second sum S2. In this case, the first term T1 is, e.g., determined as an integral, e.g., a trapezoidal integral trapz, of the absolute values abs ($SDG_i$) of the spectral values $SDG_i$ of the second derivative SDG over the spectral range $\Delta\lambda$, e.g., by:

$$T1a := trapz(\text{abs}(SDG_i)) = S1 + S2$$

As an alternative, in certain embodiments, the first term T1 is, e.g., determined as term given by a weighted sum of the first sum S1 and the second sum S2.

As an example, in these embodiment, the first term T1 is, e.g., determined as a term T1b given by the sum of the first sum S1 and the product of a penalty factor pen and the second sum S2, e.g., by:

$$T1b := trapz(relU(Gsd, i)) + pen_1 * trapz(relU(-Gsd, i)).$$

As another example the first term T1 is, e.g., determined as a term T1c given by the sum of two products, wherein the first product is determined by multiplying the first sum S1 with a penalty factor $pen_2$, and the second product is determined by multiplying the difference between one and the penalty factor $pen_2$ with the second sum S2, e.g., by:

$$T1c := pen_2 * trapz(relU(Gsd, i)) + (1 - pen_2) * trapz(relU(-Gsd, i))$$

In applications in which the reference spectrum $I_{ref}$ is a peaky spectrum, the spectral values $SDG_i$ of the additional peaks Psd and valleys Vsd of the second derivative SDG caused by over-subtraction or under-subtraction of the peaks Pr1, Pr2, Pr3 included in the reference spectrum $I_{ref}$ scale with size of the difference between scaling coefficient s and the coefficient value $s_0$ corresponding to the magnitude of the contributions of the interfering influences included in the measured spectrum $I_m$. This causes the first term T1 to be a V-shaped function of the scaling coefficient s exhibiting a distinct minimum $E_{min}(s_0)$ at the coefficient value $s_0$ corresponding to the magnitude of the contributions of the interfering influences included in the measured spectrum $I_m$. The V-shape provides the advantage of enabling an accurate determination of the coefficient value so minimizing the first term T1.

Figure 12:
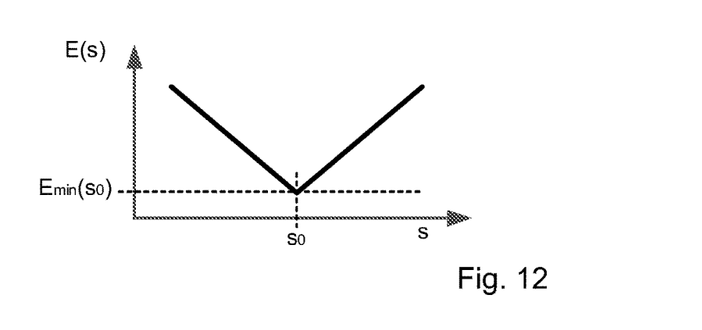
FIG. 12 shows an error function.

Thus, in certain embodiments, the error function E(s) is, e.g., given by the first term T1, e.g., by E(s):=T1. This is illustrated in FIG. 12 showing an exemplary embodiment of the error function E(s) determined based on the measured spectrum $I_m$ shown in FIG. 3 and the reference spectrum $I_{ref}$ shown in FIG. 4, wherein the error function E(s) is given by the first term T1.

As an alternative, in certain embodiments, the error function E(s) employed in method step A5, e.g., includes at least one additional term. In these embodiments, the error function E(s) is, e.g., given by a sum or a weighted sum of the first term T1 and each additional term.

As an example, in certain embodiments, the error function E(s), e.g., includes a second term T2 corresponding to an error of the difference spectrum function G due to negative spectral intensity values $G_i$ of the difference spectrum function G caused by over-subtraction.

Such an example is illustrated in FIG. 10 where over-subtraction of each of the three peaks Pr1, Pr2, Pr3 causes the spectral intensity values $G_i$ of the difference spectrum function G to be negative in the spectral regions in which the spectral intensity values of the product of the scaling coefficient $s_2$ and the reference spectrum $I_{ref}$ is larger than the corresponding spectral intensity values $I_{m,i}$ of the measured spectrum $I_m$. In FIG. 10, these regions are the spectral regions in which the difference spectrum function G exhibits the minima Min(Pr1), Min(Pr2), $Min_1$(Pr3), $Min_2$(Pr3).

The same effect of over-subtraction causing the difference spectrum function G to exhibit negative spectral intensity values $G_i$ in the spectral regions in which the spectral intensity values of the product of the scaling coefficient s and the reference spectrum $I_{ref}$ are larger than the corresponding spectral intensity values $I_{m,i}$ of the measured spectrum $I_m$ also occurs in applications in which the reference spectrum $I_{ref}$ is a smooth spectrum.

Regardless of whether the reference spectrum $I_{ref}$ is peaky or smooth, the second term T2 is, e.g., determined as the sum of areas enclosed underneath the difference spectrum function G in all spectral regions in which the spectral intensity values $G_i$ of the difference spectrum function G are negative. In certain embodiments, the second term T2 is, e.g., determined as an integral, e.g., a trapezoidal integral trapz of the rectified linear unit relU of minus one times the spectral intensity values $G_i$ of the difference spectrum function G over the spectral range, e.g., by T2:=trapz (relU(−Gsd,i)).

In certain embodiments, the error function E(s) is, e.g., given by the sum of the first term T1 and the product of a penalty factor pen and the second term T2, e.g., by E(s):=T1+pen*T2.

The E(s) including the second term T2 is especially advantageous in applications in which even an, in principle, negligibly small amount of over-subtraction is to be avoided, e.g., because further data processing of the Raman difference spectra ΔI determined based on the coefficient value $s_0$ is unable to cope with negative spectral intensity values of the Raman difference spectra ΔI, even if they are negligibly small.

Considering that the second derivative SDG of the difference spectrum function G is zero in all spectral regions in which the difference spectrum function G is constant or a linear function of the spectral line λ and that the second term T2 on its own does not prevent under-subtraction, embodiments in which the error function E(s) given by the first term T1, as well as embodiments in which the error function E(s) given by a sum or the weighted sum of the first term T1 and the second term T2, e.g., by E(s):=T1+pen*T2, are preferably only employed in applications in which the reference spectrum $I_{ref}$ is a peaky spectrum.

This can be ensured in various ways. In certain embodiments, this is, e.g., accomplished by limiting the applications where the method 200 disclosed herein is employed to applications in which the reference spectrum $I_{ref}$ is a peaky spectrum.

In other embodiments, the method 200, e.g., includes a method step K of, in each application, differentiating whether the reference spectrum $I_{ref}$ is a peaky spectrum or a smooth spectrum.

Based on this differentiation, the coefficient value $s_0$ of the scaling coefficient s is then, e.g., only determined based on the error function E(s) given by the first term T1 or on the error function E(s) given by the sum or the weighted sum of the first term T1 and the second term T2, in case the reference spectrum $I_{ref}$ is a peaky spectrum.

As an option, such an embodiment of the method 200, e.g., includes a further method step A5' of determining the coefficient value so such that it minimizes the replacement error function RE(s), in case the reference spectrum $I_{ref}$ is a smooth spectrum.

The replacement error function RE(s) is, e.g., configured such that it exhibits a distinct minimum at the coefficient value $s_0$ corresponding to the magnitude of the interfering influences included in the measured spectrum in applications in which the reference spectrum $I_{ref}$ is a smooth spectrum.

With respect to the replacement error function RE(s), the functions described in the introduction of the present disclosure may be employed. As an example, a replacement error function RE(s) given by a variance of the second order derivative SDG of the difference spectrum function G may be employed. Another example is a replacement error function RE(s) given by a sum of a first term corresponding to an asymmetric weighted sum of the squares of the differences between the spectral intensity values $I_{m,i}$ of the measured spectrum $I_m$ and the scaled reference spectrum $s*I_{ref}$ and a product of a penalty factor q and a second term corresponding to the sum of the squares of the second derivatives $SDI_{ref,i}$ of the reference spectrum $I_{ref}$ at individual spectral lines $\lambda_i$, e.g., by:

$$RE(s) := \sum_{i=1}^{n} w_i * (I_{m,i} - s * I_{ref,i})^2 + q * \sum_{i=1}^{n} (SDI_{ref,i})^2$$

wherein the weighing factors $w_i$ applied to the squares of differences due to spectral intensity values $I_{m,i}$ of the measured spectrum $I_{m,i}$ exceeding the corresponding spectral intensity values $I_{ref,i}$ of the reference spectrum $I_{ref}$ are substantially smaller than weighing factors $w_i$ assigned to the squares of differences due to spectral intensity values $I_{m,i}$ of the measured spectrum $I_{m,i}$ subsiding the corresponding spectral intensity values $I_{ref,i}$ of the reference spectrum $I_{ref}$.

With respect to the method step K of differentiating whether the reference spectrum $I_{ref}$ is peaky or smooth, for some applications, it may be known in advance whether the reference spectrum $I_{ref}$ is a peaky spectrum or not. In this case, the differentiation is, e.g., performed based on this prior knowledge.

As an alternative, in certain embodiments, the method step K, e.g., includes determining whether the reference spectrum $I_{ref}$ is a peaky spectrum.

In such embodiments, the method step K, e.g., includes performing a visual inspection of the intensity profile $I_{ref}(\lambda)$ of the reference spectrum $I_{ref}$ and determining the reference spectrum $I_{ref}$ to be a peaky spectrum in case it includes at least one distinct peak Pr1, Pr2, Pr3.

As an alternative, in certain embodiments, method step K, e.g., includes determining the baseline $b(\lambda)$ of the reference spectrum $I_{ref}$ and determining a residual spectrum R corresponding to a difference between the reference spectrum $I_{ref}$ and the baseline $b(\lambda)$, e.g., by $R:=I_{ref}-b(\lambda)$. Following this determination, an indicator KP corresponding to a degree of peakiness of the residual spectrum R is determined.

In certain embodiments, the indicator KP is, e.g., determined based on the sum of the squares of the spectral intensity values Ri of the residual spectrum R, e.g., as a ratio of the sum of the squares of the spectral intensity values Ri divided by a mean RA of the spectral intensity values Ri, e.g., by:

$$KP := \frac{1}{RA}\sum_{i=1}^{n} R_i^2$$

As an alternative, in certain embodiments, the indicator KP is, e.g., determined as or based on a variance of the residual spectrum or based on another function of the residual spectrum R corresponding to the degree of peakiness of the residual spectrum R.

Following the determination of the indicator KP, the reference spectrum $I_{ref}$ is then determined to be a peaky spectrum in case the indicator KP is larger than a predetermined threshold Kr and/or determined to be a smooth spectrum in case the indicator KP is smaller than the threshold Kr.

Differentiating whether the reference spectrum $I_{ref}$ is peaky or smooth, does however require at least some additional effort, e.g., due to additional computing power required and/or the increased complexity of the computer program executed by the difference spectra determination unit 120 performing the method 200 based on the measured spectra $I_m$ and the reference spectrum $I_{ref}$ provided to the difference spectra determination unit 120.

This burden can be avoided by determining the error function E(s) employed in method step A5 such that it can be used in applications in which the reference spectrum $I_{ref}$ is a peaky spectrum, as well as in applications in which the reference spectrum $I_{ref}$ is a smooth spectrum.

In certain embodiments, this is, e.g., achieved by the error function E(s) including the first term T1 and an additional function f(s) of the scaling coefficient s exhibiting a distinct minimum at the coefficient value $s_0$ corresponding to the magnitude of the interfering influences included in the measured spectrum $I_m$ in applications in which the reference spectrum $I_{ref}$ is a smooth spectrum. In such embodiments, the error function E(s) is, e.g., determined as a sum or a weighted sum of the first term T1 and the additional function f(s).

In certain embodiments, the error function E(s) including the first term T1 and the function f(s) is, e.g., given by a function including the first term T1 and the second term T2 described above and an additional third term T3 corresponding to an error of the difference spectrum function G due to under-subtraction. The third term T3 is, e.g., given by the sum of areas enclosed underneath the difference spectrum function G in all spectral regions in which the spectral intensity values $G_i$ of the difference spectrum function G are positive. In this respect, the third term T3 is, e.g., determined as an integral, e.g., a trapezoidal integral trapz, of the rectified linear unit relU of the spectral intensity values $G_i$ of the difference spectrum function G over the spectral range $\Delta\lambda$, e.g., by T3:=trapz (relU($G_i$)).

In such embodiments, the error function E(s) is, e.g., determined as a sum or a weighted sum of the first term T1, the second term T2 and the third term T3, e.g., by E(s): =T1+$pen_3$*T2+T3, wherein $pen_3$ is a penalty factor applied to the second term T2 that penalizes over-subtraction.

The error function E(s) including the first term T1 and the function f(s), e.g., the function f(s) given by f(s):=$pen_3$*T2+T3, provides the advantage of being employable in method step A5 in each application, regardless of whether the reference spectrum $I_{ref}$ is a peaky spectrum or a smooth spectrum. This provides the advantage that, in each application, it neither has to be known nor determined whether the reference spectrum $I_{ref}$ is a peaky spectrum or not.

Using the error function E(s) including the first term T1 and the function f(s) in each application provides the advantage of simplifying the computer program installed on the difference spectra determination unit 120 (shown in FIG. 2) performing the determination of the coefficient value $s_0$. The function f(s) including the second term T2 and the third term T3 provides the advantage of needing very little computing power to determine both additional terms T2, T3. The error function E(s) including the function f(s) further provides the advantage that no replacement error function RE(s) is needed to cover applications in which the reference spectrum $I_{ref}$ is not peaky, and that the method 200 shown in FIG. 1 can be or is performed without discriminating between peaky and smooth reference spectra $I_{ref}$ and correspondingly also without performing the method step K of determining whether the reference spectra $I_{ref}$ are peaky spectra.

Regardless of whether the error function E(s) employed in method step A5 only includes the first term T1, the first term T1 and the second term T2, or the first term T1 and the function f(s), the coefficient value $s_0$ of the scaling coefficient s is determined such that it is equal to the value Min[E(s)] of the scaling coefficient s at which the error function E(s) exhibits its minimum $E_{min}$(s).

In certain embodiments, in method step A5, the coefficient value $s_0$ minimizing the error function E(s) is, e.g., determined by performing a golden section search, a particle swarm optimization method, or a gradient descent method. As an alternative, another method of determining the minimum of a function may be employed.

Following the determination of the coefficient value $s_0$, the method 200 further includes a method step A6 of, for at least one measured spectrum $I_m$ determined by the Raman spectrometer 110, determining and providing a Raman difference spectrum $\Delta I$ corresponding to the difference between the respective measured spectrum $I_m$ and the product of the coefficient value $s_0$ and the reference spectrum $I_{ref}$.

In certain embodiments, the method 200, e.g., includes with the Raman spectrometer 110 repeatedly determining and providing measured spectra $I_m$ and, for each measured spectrum $I_m$, determining and providing the corresponding Raman difference spectrum $\Delta I$.

In this case, for each measured spectrum $I_m$ the Raman difference spectrum $\Delta I$ is, e.g., determined by, based on the respective measured spectrum $I_m$, determining the coefficient value $s_0$ as described above and, based on the thus determined coefficient value $s_0$, determining the Raman difference spectrum ΔI. This is particularly advantageous in applications in which the magnitude of the contributions of the interfering influences included in the measured spectra $I_m$ may change rapidly.

As an alternative, in certain embodiments, the coefficient value so determined based on a previously determined measured spectrum $I_m$ is, e.g., employed to determine Raman difference spectra ΔI of a series of subsequently determined measured spectra $I_m$. In such embodiments, the coefficient value $s_0$ is, e.g., employed for all subsequently determined measured spectra $I_m$. As an alternative, the coefficient value $s_0$ is, e.g., updated at least once, repeatedly or periodically, by repeating the previously performed method of determining the coefficient value $s_0$ based on a newly determined measured spectrum $I_m$. The latter is particularly advantageous in applications in which the magnitude of the contributions of the interfering influences included in the measured spectra $I_m$ may change on a time scale that is long compared to the time intervals between consecutively determined measured spectra $I_m$.

Regardless of how frequently the coefficient value $s_0$ is determined and/or updated, the Raman difference spectra ΔI determined and provided in method step A6 may be used in various way.

As an example, in certain embodiments, the method 200 disclosed herein, e.g., includes a method step A7 of, based on at least one or each Raman difference spectrum ΔI determined in method step A6, determining a measurement result MR of at least one measurand of the medium. In this respect, the Raman spectroscopic measurement system 100 shown in FIG. 2, e.g., includes a signal processing unit 130, e.g., a computer, a microprocessor or another type of calculating unit, determining and providing the measurement results MR based on the Raman difference spectra ΔI provided by the difference spectra determination unit 120 and on a previously determined model MOD for determining the measurement results MR based on spectral intensity values of the Raman difference spectra ΔI.

In addition or as an alternative, in certain embodiments, the method 200, e.g., includes a method step A8 of, for at least one measurand based on Raman difference spectra ΔI determined as described above for measured spectra $I_m$ of samples SM of media exhibiting known values of the respective measurand, determining the model MOD for determining measurement results MR of the respective measurand. Determining the model MOD, e.g., includes, based on the Raman difference spectra ΔI and the corresponding known values of the respective measurand, identifying spectral features associated to the measurand and/or interrelations between spectral features associated to the measurand and determining and providing an algorithm for calculating measurement results MR of the measurand based on selected spectral intensity values of the Raman difference spectra ΔI. In certain embodiments, at least one thus determined model MOD is, e.g., subsequently used in method step A7 to determine the measurement result(s) MR.

Determining measurement results MR and/or determining at least one model MOD for determining measurement results MR based on the Raman difference spectra ΔI provides the advantage that spectral information on the measurands included in the Raman difference spectra ΔI is no longer obscured by the contributions of the interfering influences included in the measured spectra $I_m$. Thus, accurate models MOD and/or a high measurement accuracy of the measurement results MR is achieved.

We claim:

1. A method of Raman spectroscopy for performing Raman spectroscopic measurements of at least one measurand of a medium in at least one application, wherein measured spectra of the medium include contributions of interfering influences that at least partially obscure spectra features associated to the at least one measurand, the method comprising, in at least one application:
    with a Raman spectrometer, determining at least one measured spectrum of the medium;
    providing a reference spectrum of the contributions of the interfering influences included in a respective measured spectrum;
    determining a difference spectrum function corresponding to a difference between the respective measured spectrum and a product of a scaling coefficient and the reference spectrum;
    determining a second derivative of the difference spectrum function with respect to a spectral line;
    determining a coefficient value of the scaling coefficient corresponding to a magnitude of the contributions of the interfering influences included in the respective measured spectrum such that the coefficient value minimizes an error function representing an error of the difference spectrum function as a function of the scaling coefficient, wherein the error function includes a first term corresponding to an error exhibited by the difference spectrum function due to peaks included in the reference spectrum, the first term including at least one of:
        a first sum of areas enclosed underneath the second derivative of the difference spectrum function in all spectral regions in which the second derivative of the difference spectrum function is positive; and
        a second sum of areas enclosed underneath the second derivative of the difference spectrum function in all spectral regions in which the second derivative of the difference spectrum function is negative; and
    determining and providing a Raman difference spectrum corresponding to the difference between the respective measured spectrum and a product of the coefficient value and the reference spectrum.

2. The method according to claim 1, further comprising:
    with a smoothing filter, a second or higher order smoothing filter, a Savitzky-Golay filter, a second or higher order Savitzky-Golay filter or a wavelet decomposition filter, filtering the respective measured spectrum and the reference spectrum; and
    determining the difference spectrum function and/or the second derivative of the difference spectrum function based on the filtered measured spectrum and the filtered reference spectrum.

3. The method according to claim 1, wherein, at least one of:
    the first term is determined as a sum or a weighted sum of the first sum and the second sum, as an integral or a trapezoidal integral of the absolute values of the spectral values of the second derivative of the difference spectrum function over a spectral range, as a term given by the sum of the first sum and the product of a penalty factor and the second sum, or as a term given by a sum of two products, wherein the first product is determined by multiplying the first sum with the penalty factor and the second product is determined by multiplying the difference between one and the penalty factor with the second sum;

the first sum is determined as an integral or a trapezoidal integral of a rectified linear unit of the spectral values of the second derivative of the difference spectrum function over the spectral range; and the second sum is determined as an integral or a trapezoidal integral of a rectified linear unit of minus one times the spectral values of the second derivative over the spectral range.

4. The method according to claim 1, wherein the error function further includes a second term, which, at least one of:

corresponds to an error of the difference spectrum function due to negative spectral intensity values of the difference spectrum function caused by over-subtraction;

is given by a sum of areas enclosed underneath the difference spectrum function in all spectral regions in which the spectral intensity values of the difference spectrum function are negative; and is determined as an integral or a trapezoidal integral of a rectified linear unit of minus one times the spectral intensity values of the difference spectrum function over the spectral range.

5. The method according to claim 4, wherein the error function further includes a third term, which, at least one of:

corresponds to an error of the difference spectrum function due to under-subtraction;

is given by the sum of areas enclosed underneath the difference spectrum function in all spectral regions in which the spectral intensity values of the difference spectrum function are positive; and is determined as an integral or a trapezoidal integral of a rectified linear unit of the spectral intensity values of the difference spectrum function over the spectral range.

6. The method according to claim 5, wherein the error function is given by:

a sum or a weighted sum of the first term, the second term and the third term; or a sum of the first term, a product of a penalty factor and the second term and the third term.

7. The method according to claim 6, wherein in each application, the coefficient value is determined based on the error function including the first term, the second term and the third term, regardless of whether the reference spectrum is a peaky spectrum or a smooth spectrum.

8. The method according to claim 1, wherein:

the error function either includes the first term and a function of the scaling coefficient or is given by a sum or a weighted sum of the first term and a function of the scaling coefficient;

the function of the scaling coefficient is a function exhibiting a distinct minimum at the coefficient value corresponding to the magnitude of the interfering influences included in the respective measured spectrum in applications in which the reference spectrum is a smooth spectrum; and in each application, the coefficient value is determined based on the error function including the first term and the function regardless of whether the reference spectrum is a peaky spectrum or a smooth spectrum.

9. The method according to claim 1, wherein:

the method is either only performed in applications in which the reference spectrum is a peaky spectrum or includes, in each application, differentiating between whether the reference spectrum is a peaky spectrum or a smooth spectrum; and in at least one or each application in which the reference spectrum is a peaky spectrum, the error function is given by:

the first term;

a sum or a weighted sum of the first term and a second term corresponding to an error of the difference spectrum function due to negative spectral intensity values of the difference spectrum function caused by over-subtraction; or a sum of the first term and a product of a penalty factor and the second term corresponding to the error of the difference spectrum function due to negative spectral intensity values of the difference spectrum function caused by over-subtraction.

10. The method according to claim 1, further comprising, in each application:

differentiating between whether the reference spectrum is a peaky spectrum or a smooth spectrum; and based on the differentiating, determining the coefficient value such that the coefficient value minimizes the error function when the reference spectrum is a peaky spectrum, and determining the coefficient value such that the coefficient value minimizes a replacement error function when the reference spectrum is a smooth spectrum, wherein the replacement error function is:

configured to exhibit a distinct minimum at the coefficient value corresponding to the magnitude of the interfering influences included in the respective measured spectrum in applications in which the reference spectrum is a smooth reference spectrum;

given by a variance of the second order derivative of the difference spectrum function; or given by a sum of a first term corresponding to an asymmetric weighted sum of the squares of the differences between the spectral intensity values of the respective measured spectrum and the scaled reference spectrum and a product of a penalty factor and a second term corresponding to the sum of the squares of the second derivatives of the reference spectrum at the individual spectral lines, wherein the weighing factors applied to the squares of differences due to spectral intensity values of the respective measured spectrum exceeding the corresponding spectral intensity values of the reference spectrum are smaller than weighing factors assigned to the squares of differences due to spectral intensity values of the respective measured spectrum subsiding the corresponding spectral intensity values of the reference spectrum.

11. The method according to claim 1, further comprising, in at least one or each application:

determining whether the reference spectrum is a peaky spectrum; or determining whether the reference spectrum a peaky spectrum by performing a visual inspection of the reference spectrum, determining the reference spectrum to be a peaky spectrum when the reference spectrum includes at least one distinct peak; or determining whether the reference spectrum a peaky spectrum by:

determining a baseline of the reference spectrum;

determining a residual spectrum corresponding to a difference between the reference spectrum and the baseline;

based on the residual spectrum, determining an indicator corresponding to a degree peakiness of the residual spectrum; and performing at least one of:
  determining the reference spectrum to be a peaky spectrum when the indicator is larger than a predetermined threshold; and
  determining the reference spectrum to be a smooth spectrum when the indicator is smaller than the predetermined threshold.

12. The method according to claim 11, wherein the indicator is determined by:
  determining a sum of the squares of the spectral intensity values of the residual spectrum or by determining a ratio of a sum of the squares of the spectral intensity values of the residual spectrum divided by a mean of the spectral intensity values of the residual spectrum; or
  determining a variance of the residual spectrum.

13. The method according to claim 1, further comprising, based on the at least one or each Raman difference spectrum, determining a measurement result of the at least one measurand of the medium.

14. The method according to claim 1, further comprising, for the at least one measurand based on Raman difference spectra determined by this method based on measured spectra of samples of media exhibiting known values of the measurand, determining a model for determining measurement results of the respective measurand.

15. The method according to claim 1, wherein:
  in at least one or each application, the interfering influences include at least one of: light contaminations, luminescence light and/or fluorescence light exhibiting at least one intensity peak, influences of an interfering analyte, a composition of interfering analytes and/or a solvent included in the medium, and background influences and/or broad band luminescence or fluorescence light exhibiting a smooth intensity profile; and/or;
  providing the reference spectrum includes, at least one of:
    with a Raman spectrometric instrument, determining and providing at least one intensity spectrum of the interfering influences and determining and providing the reference spectrum based on these intensity spectra; and
    determining the reference spectrum based on intensity spectra of at least one interfering analyte, a composition of interfering analytes and/or a solvent included in the medium.

16. The method according to claim 1, further comprising, with the Raman spectrometer, repeatedly determining and providing measured spectra and for at least one or each measured spectrum determining and providing the corresponding Raman difference spectrum, wherein:
  for each measured spectrum, determining the Raman difference spectrum includes, based on the respective measured spectrum and the reference spectrum, determining the coefficient value corresponding to the magnitude of the contributions of the interfering influences included in the respective measured spectrum and determining the Raman difference spectrum based on this coefficient value;
  the coefficient value determined based on a previously determined measured spectrum is employed to determine Raman difference spectra of a series of subsequently determined measured spectra; or
  the coefficient value employed to determine the Raman difference spectra of successively determined measured spectra is at least once, repeatedly or periodically updated by repeating the previously performed determination of the coefficient value based on a newly determined measured spectrum.

17. A Raman spectroscopic measurement system configured to perform the method according to claim 1, the Raman spectroscopic measurement system comprising:
  a Raman spectrometer configured to determine and provide measured spectra of a medium; and
  a difference spectra determination unit configured to determine and provide Raman difference spectra based on the measured spectra and a reference spectrum of contributions of interfering influences included in the measured spectra provided to the difference spectra determination unit.

18. A non-transitory computer-readable medium storing instructions that, when executed by one or more programmable processors, cause the one or more programmable processors to perform operations for performing a method of Raman spectroscopy comprising determining and providing Raman difference spectra for performing Raman spectroscopic measurements of at least one measurand of a medium in at least one application, wherein measured spectra of the medium include contributions of interfering influences that at least partially obscure spectra features associated to the at least one measurand, based on at least one measured spectrum of the medium determined by a Raman spectrometer and a reference spectrum of the contributions of the interfering influences included in a respective measured spectrum, the operations comprising:
  determining a second derivative with respect to a spectral line of a difference spectrum function corresponding to a difference between the respective measured spectrum and the product of a scaling coefficient and the reference spectrum;
  determining a coefficient value of the scaling coefficient corresponding to a magnitude of the contributions of the interfering influences included in the respective measured spectrum such that the coefficient value minimizes an error function representing an error of the difference spectrum function as a function of the scaling coefficient, wherein the error function includes a first term corresponding to an error exhibited by the difference spectrum function due to peaks included in the reference spectrum, the first term including at least one of:
    a first sum of areas enclosed underneath the second derivative of the difference spectrum function in all spectral regions in which the second derivative of the difference spectrum function is positive; and
    a second sum of areas enclosed underneath the second derivative of the difference spectrum function in all spectral regions in which the second derivative of the difference spectrum function is negative; and
  for at least one measured spectrum determined by the Raman spectrometer, determining and providing a Raman difference spectrum corresponding to the difference between the respective measured spectrum and the product of the coefficient value and the reference spectrum.

19. A Raman spectroscopic measurement system, comprising:
  a Raman spectrometer, comprising:
    a monochromatic light source configured to transmit excitation light having a predetermined excitation wavelength a measurement region configured to accommodate a sample of a medium as to illuminate the sample; and
    a spectrometric unit configured to receive Raman scattered light emanating from the illuminated sample and to provide measured spectra, including intensity spectra of the Raman scattered light, wherein the spectrometric unit includes a disperser, a detector, and a signal processor configured to determine and to provide spectral intensity values of the measured spectra based on signals from the detector; and a difference spectra determination unit configured to determine Raman difference spectra based on the measured spectra wherein the signal processor of the spectrometric unit and the difference spectra determination unit are cooperatively configured to perform the method according to claim 1.

20. The Raman spectroscopic measurement system of claim 19, further comprising a signal processing unit configured to determine and provide a measurement result of the at least one measurand of the medium based on the Raman difference spectra provided by the difference spectra determination unit and on a previously determined model for determining the measurement result based on spectral intensity values of the Raman difference spectra.

* * * * *